US006735817B2

(12) United States Patent
Bair et al.

(10) Patent No.: US 6,735,817 B2
(45) Date of Patent: May 18, 2004

(54) UPRIGHT VACUUM CLEANER WITH CYCLONIC AIR FLOW

(75) Inventors: Kenneth W. Bair, Akron, OH (US); Richard C. Gibbs, Burton, OH (US); Mark E. Reindle, Parma, OH (US); Michael F. Wright, Stow, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

(21) Appl. No.: 10/094,675

(22) Filed: Mar. 11, 2002

(65) Prior Publication Data

US 2002/0095742 A1 Jul. 25, 2002

Related U.S. Application Data

(63) Continuation of application No. 09/461,120, filed on Dec. 14, 1999, now Pat. No. 6,353,963, which is a continuation-in-part of application No. 09/122,541, filed on Jul. 24, 1998, now Pat. No. 6,026,540, which is a continuation-in-part of application No. 09/004,999, filed on Jan. 9, 1998, now Pat. No. 6,003,196.

(51) Int. Cl.[7] .................................................. A47L 9/16
(52) U.S. Cl. ........................................... 15/353; 15/352
(58) Field of Search ........................ 15/350, 351, 352, 15/353

(56) References Cited

U.S. PATENT DOCUMENTS

| 930,125 A | 8/1909 | Barrett |
|---|---|---|
| 1,003,844 A | 9/1911 | Winans et al. |
| 1,029,562 A | 6/1912 | Prentiss |
| 1,133,543 A | 3/1915 | Duffie |
| 1,167,219 A | 1/1916 | Replogle |
| 1,230,827 A | 6/1917 | Duffie |
| 1,234,095 A | 7/1917 | Duffie |
| 1,768,617 A | 7/1930 | Lee |
| 1,887,600 A | 11/1932 | Replogle |
| 2,019,895 A | 11/1935 | Dow |
| 2,171,248 A | 8/1939 | Van Berkel |
| 2,187,164 A | 1/1940 | Leathers |

(List continued on next page.)

FOREIGN PATENT DOCUMENTS

| EP | 0 042 723 | 8/1985 |
|---|---|---|
| EP | 0 489 468 A1 | 6/1992 |
| FR | 1468142 | 12/1967 |

(List continued on next page.)

OTHER PUBLICATIONS

Fantom Vacuum Cleaner Owner's Manual (©1993).
Fantom Fury Vacuum Cleaner Owner's Manual (©1995).
Fantom Vacuum Cleaner Service Manual for Iona® Model Series F–9000.

(List continued on next page.)

*Primary Examiner*—Terrence R. Till
(74) *Attorney, Agent, or Firm*—Fay, Sharpe, Fagan, Minnich & McKee, LLP

(57) ABSTRACT

An upright vacuum cleaner (A) includes an upright housing section (B) and a nozzle section (C). A cyclonic airflow dirt and dust separating chamber (54) is defined in said upright housing section. A suction source (E) pulls air and entrained dirt, dust, and other contaminants through a main suction opening (26) formed in the underside (24) of the nozzle and into the cyclonic airflow chamber (54). The cyclonic airflow chamber causes the suction airstream to travel in a cyclonic path such that the entrained contaminants are separated therefrom and deposited into a dirt container (52) that defines the chamber (54). A main filter element (K) filters residual contaminants from the suction airstream between the chamber and the suction source. The main filter element is preferably made from high-density polyethylene porous filter media. A final filter assembly (F) filters the suction airstream discharged by the suction source to ensure that the air discharged into the atmosphere is contaminant free, including those contaminants introduced into the airstream by the suction source itself.

55 Claims, 8 Drawing Sheets

U.S. PATENT DOCUMENTS

| | | |
|---|---|---|
| 2,266,075 A | 12/1941 | Replogle |
| 2,316,836 A | 4/1943 | Breuer |
| 2,394,923 A | 2/1946 | Little |
| 2,475,808 A | 7/1949 | Storm, Jr. |
| 2,507,897 A | 5/1950 | Gavagnin |
| 2,516,707 A | 7/1950 | Lewyt et al. |
| 2,524,117 A | 10/1950 | Storm, Jr. |
| 2,542,634 A | 2/1951 | Davis et al. |
| 2,564,339 A | 8/1951 | Nerheim |
| 2,643,733 A | 6/1953 | Shellman |
| 2,921,646 A | 1/1960 | Poole |
| 3,177,635 A | 4/1965 | Cawl et al. |
| 3,320,727 A | 5/1967 | Farley et al. |
| 3,413,779 A | 12/1968 | Takahashi et al. |
| 3,543,325 A | 12/1970 | Hamrick |
| 3,614,860 A | 10/1971 | Grellsson |
| 3,626,545 A | 12/1971 | Sparrow |
| 3,797,064 A | 3/1974 | MacFarland |
| 3,820,310 A | 6/1974 | Fromknecht et al. |
| 3,853,618 A | 12/1974 | Tu et al. |
| 3,910,781 A | 10/1975 | Bryant, Jr. |
| 4,072,483 A | 2/1978 | Doyle, Jr. |
| 4,108,778 A | 8/1978 | Lambert et al. |
| 4,118,208 A | 10/1978 | Klinedinst |
| 4,172,710 A | 10/1979 | van der Molen |
| 4,198,726 A | 4/1980 | Powell, Jr. |
| 4,268,288 A | 5/1981 | Coombs |
| 4,276,070 A | 6/1981 | Hug |
| 4,284,422 A | 8/1981 | Ferland |
| 4,355,434 A | 10/1982 | Gongwer |
| 4,373,228 A | 2/1983 | Dyson |
| 4,426,211 A | 1/1984 | Ataka et al. |
| 4,443,235 A | 4/1984 | Brenholt et al. |
| 4,457,043 A | 7/1984 | Oeberg et al. |
| 4,486,206 A | 12/1984 | Miyakawa et al. |
| 4,571,772 A | 2/1986 | Dyson |
| 4,573,236 A | 3/1986 | Dyson |
| 4,581,787 A | 4/1986 | Torigoe et al. |
| 4,593,429 A | 6/1986 | Dyson |
| 4,643,748 A | 2/1987 | Dyson |
| 4,665,582 A | 5/1987 | Richmond et al. |
| 4,718,924 A | 1/1988 | DeMarco |
| RE32,751 E | 9/1988 | Joss et al. |
| 4,769,052 A | 9/1988 | Kowalski |
| 4,826,515 A | 5/1989 | Dyson |
| 4,853,008 A | 8/1989 | Dyson |
| 4,853,011 A | 8/1989 | Dyson |
| 4,934,019 A | 6/1990 | Shorthill et al. |
| 4,944,780 A | 7/1990 | Usmani |
| 4,960,446 A | 10/1990 | Werner et al. |
| 4,967,443 A | 11/1990 | Krasznai et al. |
| 5,018,240 A | 5/1991 | Holman |
| 5,020,186 A | 6/1991 | Lessig, III et al. |
| 5,062,870 A | 11/1991 | Dyson |
| 5,078,761 A | 1/1992 | Dyson |
| 5,080,697 A | 1/1992 | Finke |
| 5,090,975 A | 2/1992 | Requejo et al. |
| 5,090,976 A | 2/1992 | Dyson |
| 5,101,532 A | 4/1992 | Dyson et al. |
| 5,106,488 A | 4/1992 | Jonasson |
| 5,107,567 A | 4/1992 | Ferrari et al. |
| 5,129,125 A | 7/1992 | Gamou et al. |
| 5,135,552 A | 8/1992 | Weistra |
| 5,145,499 A * | 9/1992 | Dyson .................. 55/337 |
| 5,160,356 A | 11/1992 | Dyson |
| 5,230,722 A | 7/1993 | Yonkers |
| 5,248,323 A | 9/1993 | Stevenson |
| 5,254,147 A | 10/1993 | Finke |
| 5,267,371 A | 12/1993 | Soler et al. |
| 5,271,751 A | 12/1993 | Lägler |
| 5,287,591 A | 2/1994 | Rench et al. |
| 5,307,538 A | 5/1994 | Rench et al. |
| 5,427,597 A | 6/1995 | Osendorf |
| 5,464,460 A | 11/1995 | Bosses |
| 5,524,321 A | 6/1996 | Weaver et al. |
| 5,558,697 A | 9/1996 | Dyson et al. |
| 5,593,479 A | 1/1997 | Frey et al. |
| 5,603,741 A | 2/1997 | Frey |
| 5,659,922 A | 8/1997 | Louis |
| 5,685,894 A | 11/1997 | Bowerman et al. |
| 5,704,956 A | 1/1998 | Loveless et al. |
| 5,725,623 A | 3/1998 | Bowerman et al. |
| 5,746,795 A | 5/1998 | Witter |
| 5,779,745 A | 7/1998 | Kilström |
| 5,795,358 A | 8/1998 | Scanlon et al. |
| D398,097 S | 9/1998 | Murphy et al. |
| 5,829,090 A | 11/1998 | Melito et al. |
| 5,867,863 A | 2/1999 | McCormick |
| 5,922,093 A | 7/1999 | James et al. |
| 5,935,279 A | 8/1999 | Kilström |
| 5,946,771 A | 9/1999 | Bosyj et al. |
| 5,961,677 A | 10/1999 | Scott |
| 6,003,196 A | 12/1999 | Wright et al. |
| 6,012,200 A | 1/2000 | Murphy et al. |
| 6,035,486 A | 3/2000 | McCormick |
| 6,070,291 A | 6/2000 | Bair et al. |
| 6,085,382 A | 7/2000 | Bobrosky et al. |
| 6,146,434 A | 11/2000 | Scalfani et al. |
| 6,192,550 B1 | 2/2001 | Hamada et al. |
| 6,256,834 B1 | 7/2001 | Meijer et al. |
| 6,260,234 B1 | 7/2001 | Wright et al. |
| 6,482,252 B1 * | 11/2002 | Conrad et al. .................. 96/57 |

FOREIGN PATENT DOCUMENTS

| | | |
|---|---|---|
| FR | 1468142 | 2/1996 |
| GB | 479455 | 2/1938 |
| GB | 1049292 | 11/1963 |
| GB | 1111074 | 4/1968 |
| GB | 2 265 096 A | 9/1993 |
| GB | 2 280 388 A | 2/1995 |
| GB | 2 298 598 | 9/1996 |
| JP | 3-103059 | 4/1991 |
| JP | H3-10307 | 10/1991 |
| WO | WO 8/402282 | 6/1984 |
| WO | WO 99/30602 | 6/1999 |
| WO | WO 99/30604 | 6/1999 |
| WO | WO 99/30605 | 6/1999 |

OTHER PUBLICATIONS

Dyson DC 03 Operating Manual, Dec. 11, 1997.
"Flair on the Floor" Applicance, Dec. 1994; pp. 24–28.
Pictures of Shop–Vac QSP 16 Gallon Wet/Dry Vacuum and Excerpt of Shop Vac Article, Popular Mechanics, Sep. 1996, p. 88.
"The Bagless Vac A World First", Appliance Manufacturer, Feb. 1992, pp. 21–22.
NATIONAL flyer, in Japanese, dated Feb. 5, 1981 concerning vacuum cleaner Model No. MC–110u.

* cited by examiner

UPRIGHT VACUUM CLEANER WITH CYCLONIC AIR FLOW

CROSS-REFERENCE TO RELATED APPLICATIONS

This application is a continuation of application Ser. No. 09/461,120 filed Dec. 14, 1999 which issued as U.S. Pat. No. 6,353,963 on Mar. 12, 2002. That application is, in turn, a continuation-in-part of Ser. No. 09/122,541 filed on Jul. 24, 1998, which issued as U.S. Pat. No. 6,026,540 on Feb. 22, 2000. That application was, in turn, a continuation-in-part of application Ser. No. 09/004,999 filed on Jan. 9, 1998 which issued as U.S. Pat. No. 6,003,196 on Dec. 21, 1999.

BACKGROUND OF THE INVENTION

The present invention relates to vacuum cleaners. More particularly, the present invention relates to upright vacuum cleaners used for suctioning dirt and debris from carpets and floors.

Upright vacuum cleaners are well known in the art. The two major types of these vacuum cleaners are a soft bag vacuum cleaner and a hard shell vacuum cleaner. In the hard shell vacuum cleaner, a vacuum source generates the suction required to pull dirt from the carpet or floor being vacuumed through a suction opening and into a filter bag housed within the hard shell upper portion of the vacuum cleaner.

To avoid the need for vacuum filter bags, and the associated expense and inconvenience of replacing the bag, another type of upright vacuum cleaner utilizes cyclonic air flow, rather than a filter bag, to separate the majority of the dirt and other particulates from the suction air stream. The air is then filtered to remove residual particulates, returned to the motor and exhausted.

For many of the prior art cyclonic air flow vacuum cleaners, the process of emptying the dirt collection container has been found inconvenient and often resulted in the spillage of the cup contents. Also, the replacement of filter elements in these units has not been convenient.

In some cyclonic air flow vacuum cleaners, the exhaust air is not free of residual contaminants. Because the cyclonic action of such conventional cyclonic vacuum cleaners does not completely remove all dust, dirt and other contaminants from the suction air stream, it is necessary to include a filter downstream from the cyclonic chamber. However, the conventional filter elements so used have caused considerable difficulty. A conventional filter which is sufficiently fine to filter the air stream effectively, unduly restricts air flow and decreases the effectiveness of the cyclonic action. On the other hand, a coarse filter does not effectively filter the air stream of residual contaminants. Furthermore, conventional filter media, such as paper or fibrous media, has been found to clog readily thereby unduly decreasing air flow rates over time.

Accordingly, it has been deemed desirable to develop a new and improved upright vacuum cleaner having a cyclonic air flow which would overcome the foregoing difficulties and others while providing better and more advantageous overall results.

SUMMARY OF THE INVENTION

According to the present invention, a new and improved upright vacuum cleaner is provided.

In accordance with the first aspect of this invention, a vacuum cleaner includes a housing defining a cyclonic air flow chamber for separating contaminants from a suction air stream. The housing includes an inlet for the chamber and an outlet for the chamber. The suction air stream inlet and outlet are both in fluid communication with the cyclonic air flow chamber. A suction opening is defined on the housing. The suction opening is fluidically connected with the cyclonic air flow chamber inlet. An air stream suction source is located on the housing. The suction source has an inlet fluidically connected to the cyclonic chamber outlet and a suction source outlet. The suction source selectively establishes and maintains a suction air stream from the suction opening to the suction source outlet. A main filter support extends upwardly from the floor of the housing for releasably securing a main filter element centrally in the cyclonic air flow chamber. A main filter element is secured thereto. A dirt cup is selectively positioned in the housing with the main filter element being located in the dirt cup.

One advantage of the present invention is the provision of a new and improved vacuum cleaner.

Another advantage of the invention is found in the provision of the vacuum cleaner with a cyclonic air flow chamber through which the suction air stream flows for separating dust and dirt from the air stream and for depositing the separated dust and dirt into an easily and conveniently emptied dirt cup.

Still another advantage of the present invention resides in the provision of a cyclonic air flow upright vacuum cleaner with a main filter that effectively filters residual contaminants from the suction air stream between the cyclonic air flow chamber and the motor assembly without unduly restricting air flow and without premature clogging.

Yet another advantage of the present invention is the provision of a cyclonic air flow upright vacuum cleaner in which a direct air path is provided between a suction air flow inlet, a suction air flow outlet and a vacuum source preferably positioned directly beneath the suction air flow outlet.

Still yet another advantage of the present invention is the provision of a cyclonic air flow upright vacuum cleaner with a final filter located downstream from the suction motor assembly for filtering the suction air stream immediately prior to its exhaustion into the atmosphere.

A further advantage of the present invention is the provision of a vacuum cleaner with a tangential dirty air inlet into a dust separation chamber and an axial clean air outlet from the dust separation chamber, wherein the outlet is separated from the inlet by a filter. Preferably, the dirty air inlet is located at an upper end of the dust separation chamber and the outlet is located at a lower end thereof.

A yet further advantage of the present invention is the provision of a vacuum cleaner with a cyclonic air flow chamber wherein accummulated dust and dirt in the chamber serve as a filter means for further filtering at least a portion of the suction air stream passing through the chamber.

A yet further advantage of the present invention is the provision of a vacuum cleaner with a cyclonic air flow chamber and a main filter element wherein the main filter element is positioned in a removable dirt cup at least partially defining the cyclonic air flow chamber for ease of emptying the dirt cup and for cleaning the filter.

Still other benefits and advantages of the invention will become apparent to those of average skill in the art upon a reading and understanding of the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Referring now to the FIGURES, wherein the showings are for purposes of illustrating preferred embodiments of the invention only and not for purposes of limiting the same, FIGS. 1–5 illustrate an upright vacuum cleaner A including an upright housing section B and a nozzle base section C. The sections B,C are pivotally or hingedly connected through the use of trunnions or another suitable hinge assembly D so that the upright housing section B pivots between a generally vertical storage position (as shown) and an inclined use position. Both the upright and nozzle sections B,C are preferably made from conventional materials such as molded plastics and the like. The upright section B includes a handle 20 extending upward therefrom by which an operator of the vacuum A is able to grasp and maneuver the vacuum.

Figure 3:
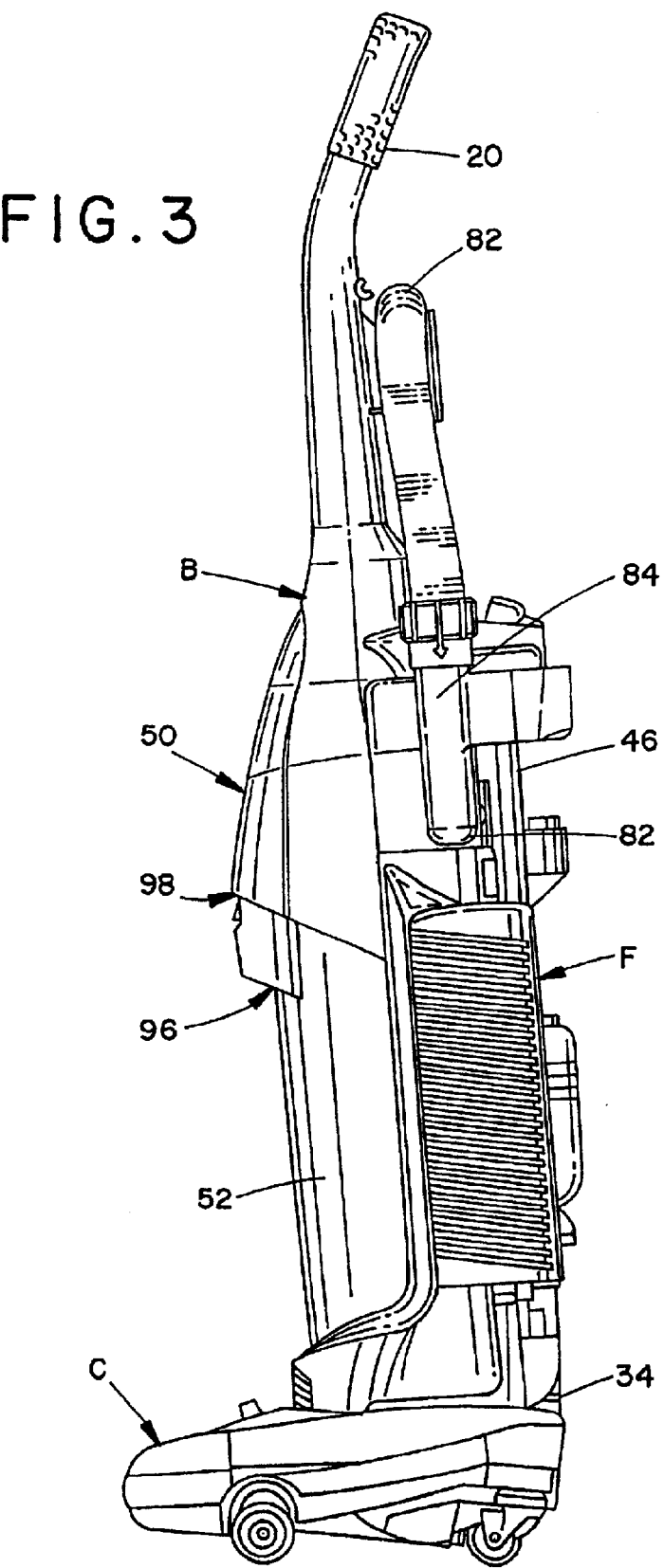
FIG. 3 is a right side elevational view of the vacuum cleaner of FIG. 1.
Figure 4:
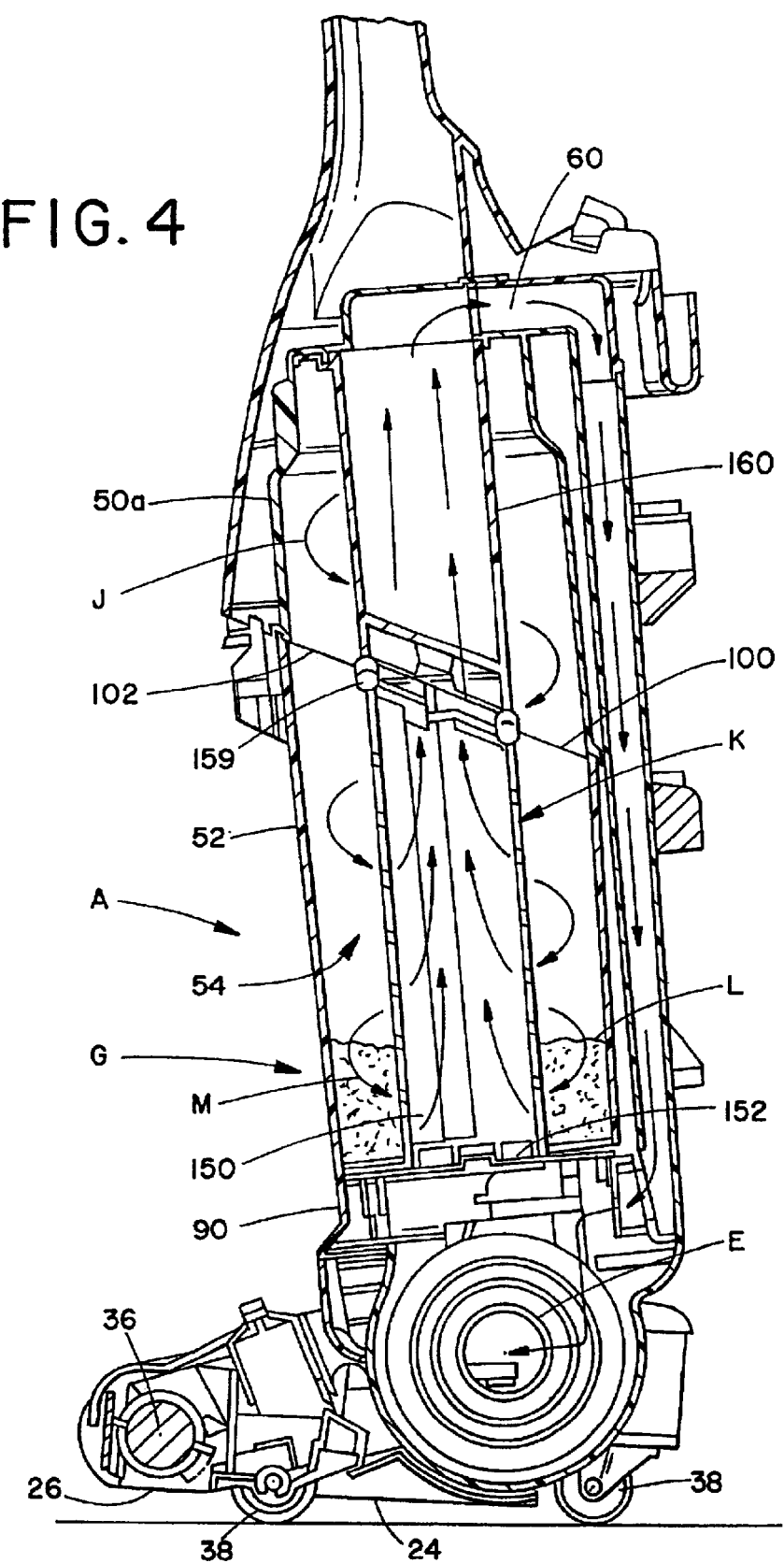
FIG. 4 is an enlarged right side elevational view in cross section of the vacuum cleaner of FIG. 1 showing air flow through the cyclonic air flow dust and dirt separating chamber.

During vacuuming operations, the nozzle base C travels across the floor, carpet, or other subjacent surface being cleaned. With reference now to FIG. 4, an underside 24 of the nozzle base includes a main suction opening 26 formed therein which extends substantially across the width of the nozzle at the front end thereof. As is known, the main suction opening 26 is in fluid communication with the vacuum upright body section B through a passage and a connector hose assembly 34 (FIG. 3). A rotating brush assembly 36 is positioned in the region of the nozzle main suction opening 26 for contacting and scrubbing the surface being vacuumed to loosen embedded dirt and dust. A plurality of wheels 38 support the nozzle on the surface being cleaned and facilitate its movement thereacross.

The upright vacuum cleaner A includes a vacuum or suction source for generating the required suction airflow for cleaning operations. A suitable suction source, such as an electric motor and fan assembly E, generates a suction force in a suction inlet and an exhaust force in an exhaust outlet. The motor assembly airflow exhaust outlet is in fluid communication with a final filter assembly F (FIG. 2) for filtering the exhaust airstream of any contaminants which may have been picked up in the motor assembly immediately prior to its discharge into the atmosphere. The motor assembly suction inlet, on the other hand, is in fluid communication with a cyclonic suction airflow dust and dirt separating region G of the vacuum A to generate a suction force therein.

The cyclonic suction air flow dust and dirt separating region G housed in the upright section B includes a cyclonic airflow chamber 54 defined by an upper fixed housing member 50a and a lower dirt cup or container 52 which is pivotally and releasably connected to the upper housing B of the vacuum cleaner.

Figure 2:
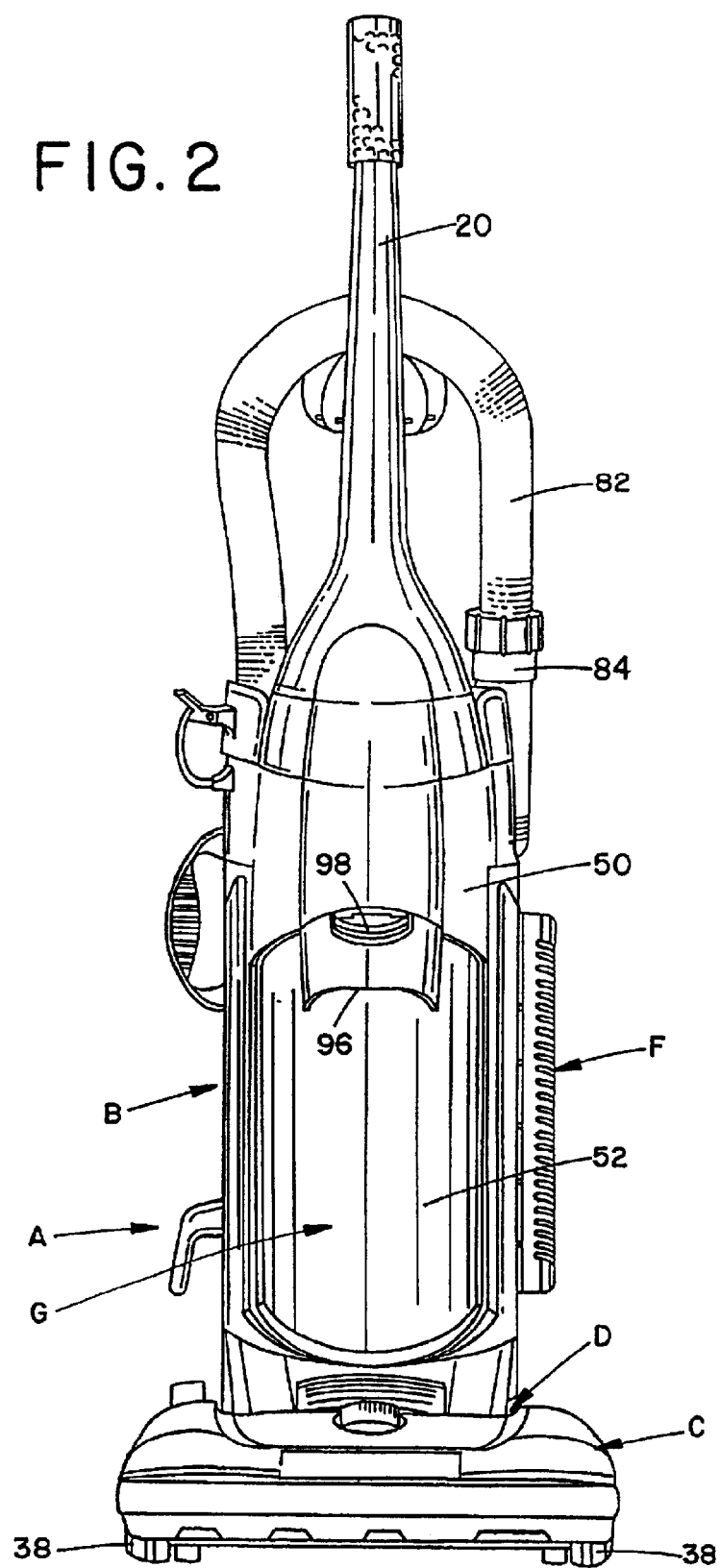
FIG. 2 is a front elevational view of the vacuum cleaner illustrated in FIG. 1.

The suction airstream enters an upper portion of the cylconic dust and dirt separation chamber 54 through a generally tangential suction airstream inlet which is formed in the upper section 50a of the main filter housing assembly 50. The suction airstream inlet of the chamber 54 is in fluid communication with a suction airstream hose 82 through a fitting 84 as illustrated in FIG. 2.

Figure 1:
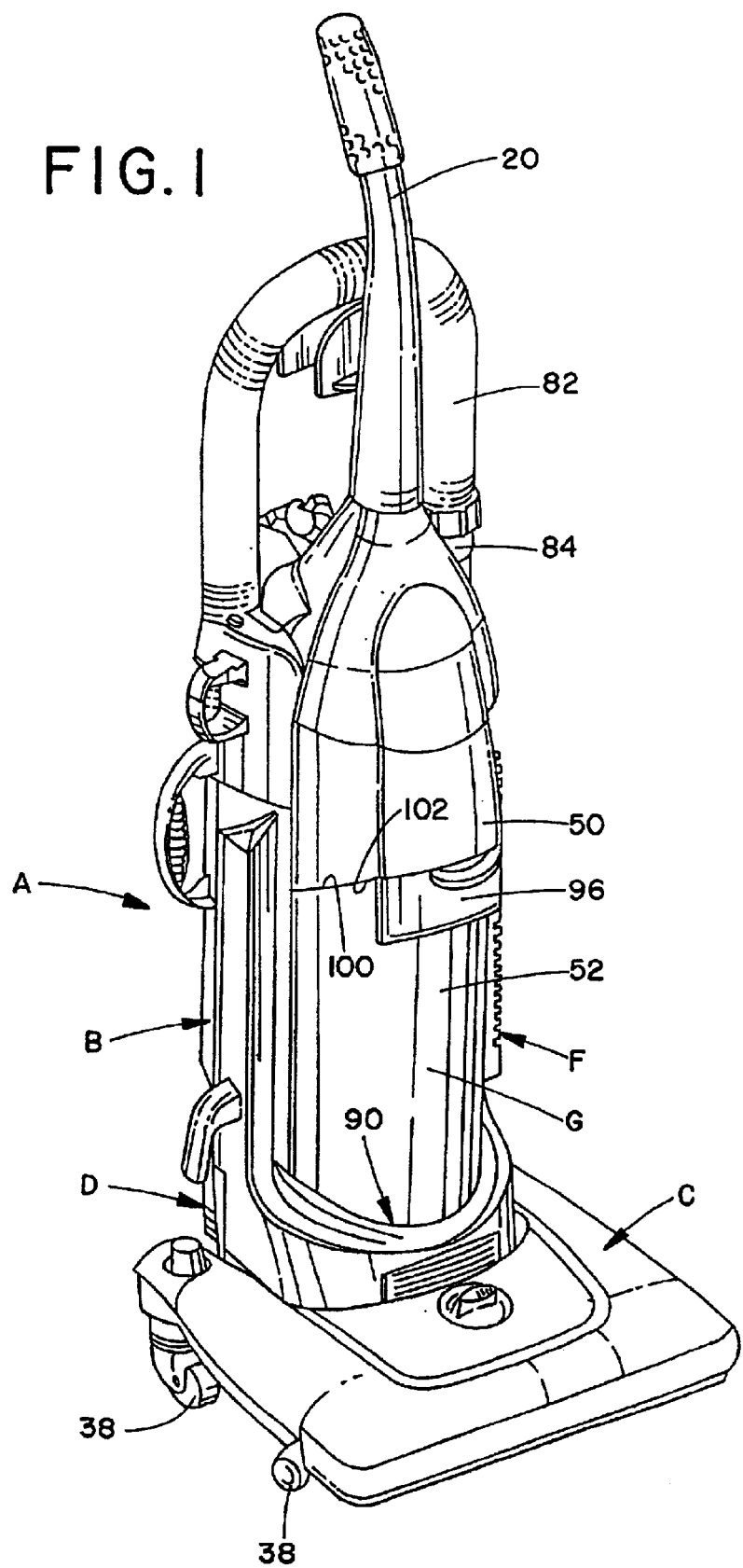
FIG. 1 is a perspective view illustrating a cyclonic air flow upright vacuum cleaner in accordance with a first embodiment of the present invention.

With reference now to FIG. 1, the dirt container 52 is connected to the vacuum cleaner upright section B through the use of a hinge assembly 90 which allows the dirt container to pivot between an operative upright position and an open forwardly tilted position. A handle 96 is provided on an exterior of the container 52 to facilitate operator movement of the container between the operative, open, and removed positions. A latch 98 (FIG. 2) retains the dirt container in the operative position. The latch 98 is biased through the use of a spring or other resilient member or via the natural resiliency of the plastic from which it is molded. The dirt container has an upper edge 100 defining an upper open end of the container. This end is preferably inclined downwardly in a direction away from the handle 20. This edge mates with the adjoining edge 102 of the upper housing member.

The dirt cup 52 includes a main filter support, such as a post, stem or like structure 150 extending upwardly from a floor or base 152 thereof. The post 150 is positioned in a central region of a cyclonic airflow chamber 154. A hollow cylindrical main filter element K is positioned over the main filter support 150.

Figure 5:
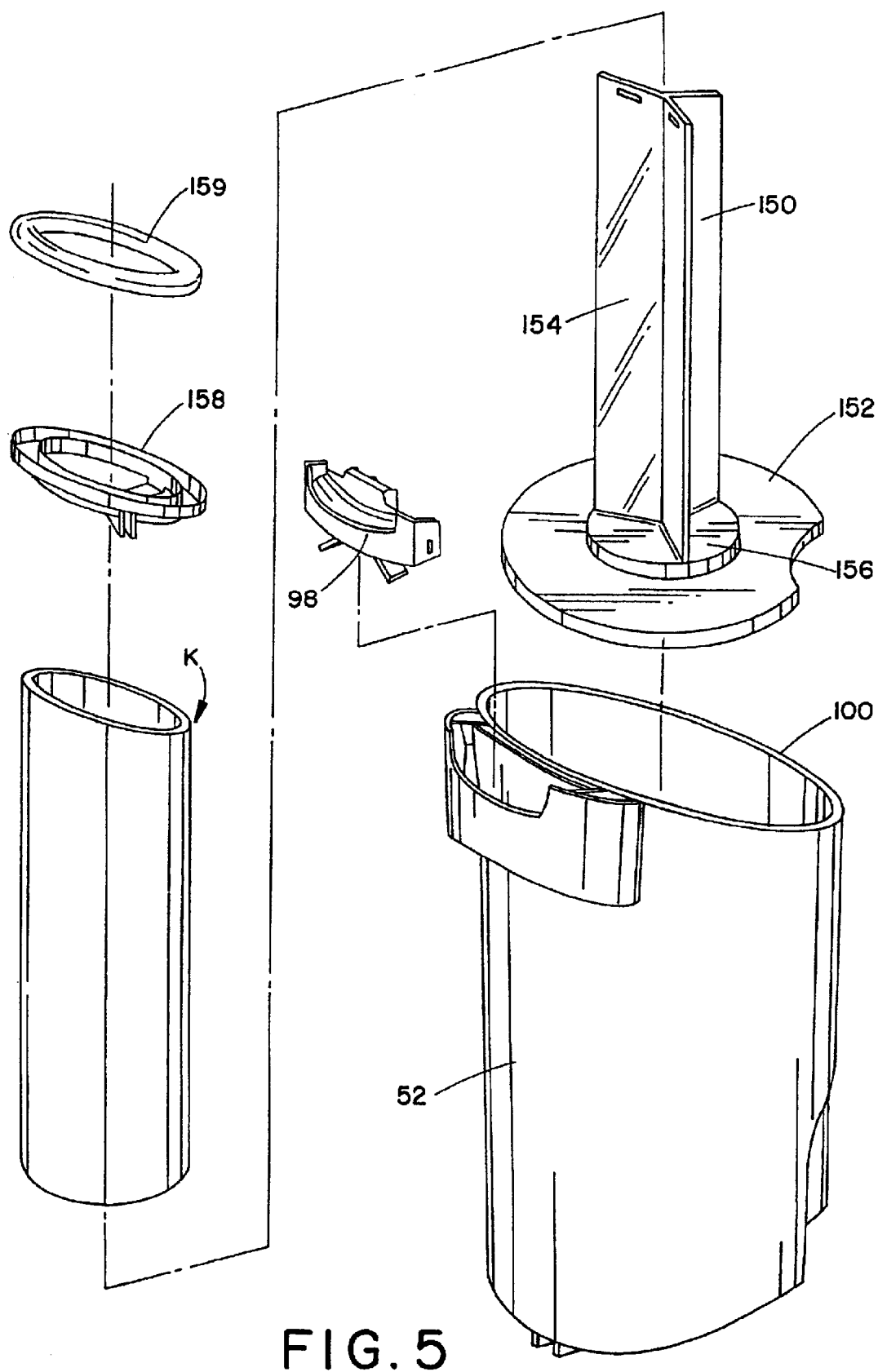
FIG. 5 is an exploded perspective view of a dust cup cylinder, filter rack and filter employed in the vacuum cleaner of FIG. 4.

With reference now to FIG. 5, the filter element K is engaged in an interference fit with vanes 154 and a disk-like plateau 156 located on the floor 152 of the filter support so that the filter is releasably yet securely retained in its operative position, even when the dirt cup 52 is removed from the vacuum cleaner and inverted for purposes of emptying the contents thereof. A filter locking means 158 accommodating a gasket 159 is provided along the uppermost edge of the main filter element K. The main filter element K extends upwardly from the dirt cup floor 152 to a level approximately equal to an upper edge 100 of the dirt cup. Most preferably, as shown herein, the upper edge of the main filter element K is also sloped in the same manner as is the dirt cup upper edge 100. Over the entire height of the dirt cup 52, an annular cyclonic airflow passage is defined between the main filter K and the dirt cup 52. The base 152 serves also as the base of the dirt cup 52. To this end, the base 152 is suitably secured by conventional means to the side walls forming the dirt cup.

The filter element K preferably comprises POREX brand, high density polyethylene-based, open-celled, porous media available commercially from Porex Technologies Corp. of Fairburn, Ga. 30212, or an equivalent foraminous filter media. This preferred filter media is a rigid open-celled foam that is moldable, machinable, and otherwise workable into any shape as deemed advantageous for a particular application. The preferred filter media has an average pore size in the range of 45 µm to 90 µm. It can have a substantially cylindrical configuration as is illustrated in FIG. 5, or any other suitable desired configuration. The filter element could also have a convoluted outer surface to provide a larger filtering area. Some filtration is also performed by the dirt in the bottom end of the dirt cup in the dirt L as shown by the arrow M.

Figure 6:
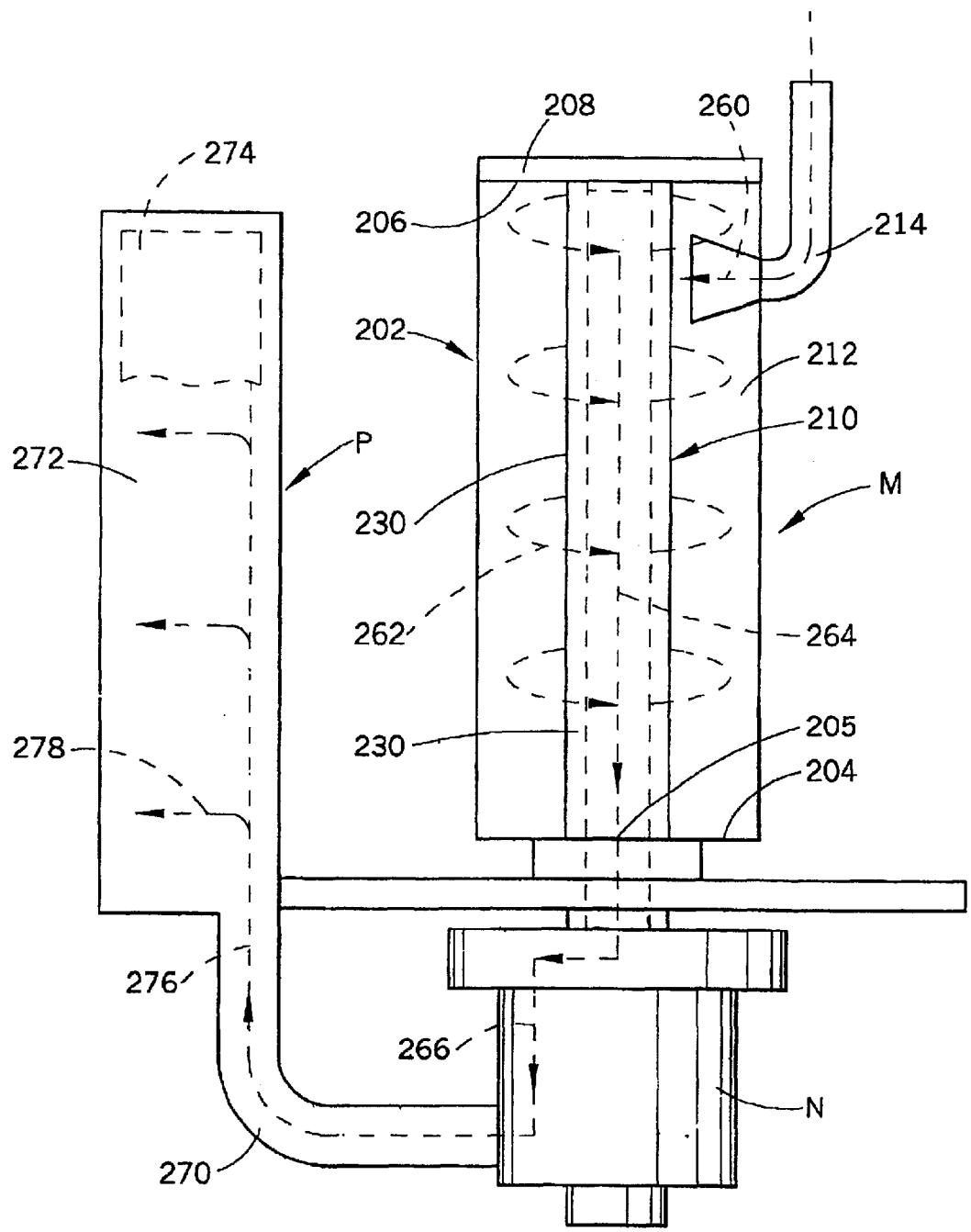
FIG. 6 is a schematic view of a cyclonic air flow dust and dirt separating chamber and adjacent components of a vacuum cleaner according to a second preferred embodiment of the present invention.
Figure 8:
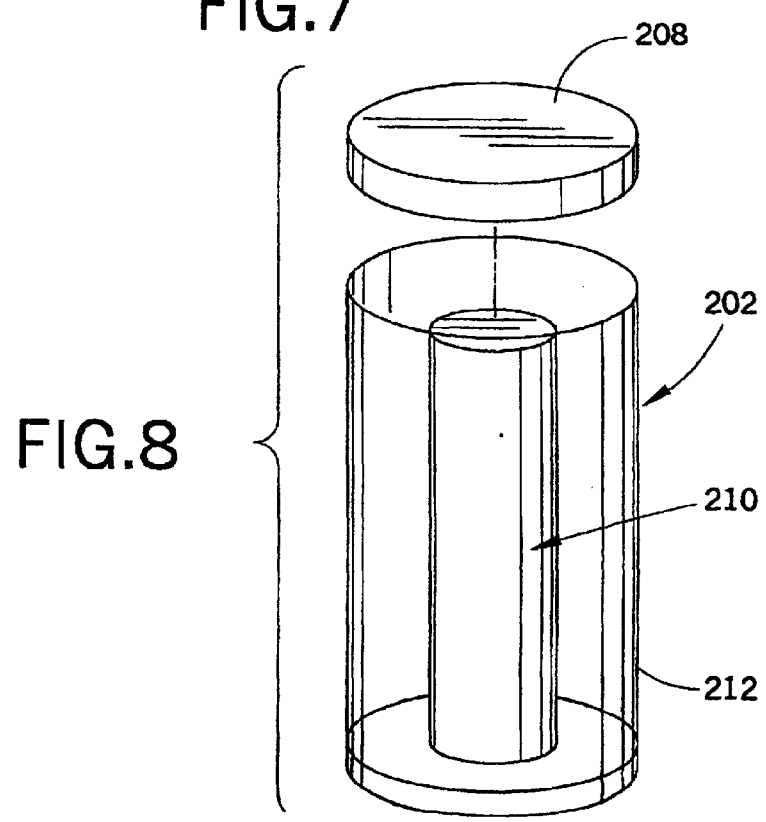
FIG. 8 is an assembled schematic perspective view of the dust cup, filter rack and filter of FIG. 7 with a lid spaced away therefrom; and, FIG. 9 is a greatly enlarged side elevational schematic view of a motor and seal interface for the vacuum cleaner of FIG. 6.

With reference now to FIG. 6, a cyclonic suction airflow dust and dirt separating region M according to a second preferred embodiment of the present invention is there illustrated. This embodiment includes a dust and dirt cup or container 202. The container has a substantially closed lower end 204 having a centrally positioned aperture 205 therein and an open upper end 206. A lid 208 (FIG. 8) can be selectively placed on the container or dirt cup.

Disposed within the dirt cup 202 is a filter and rack assembly 210. Defined between an inner wall of the dirt cup 202 and the filter and rack assembly 210 is a cyclonic chamber 212 which communicates with a suction inlet passage 214 extending into an upper end of the cyclonic airflow chamber 212. The inlet opening is oriented tangential to the cyclonic chamber 212 so as to encourage a cyclonic airflow.

Figure 7:
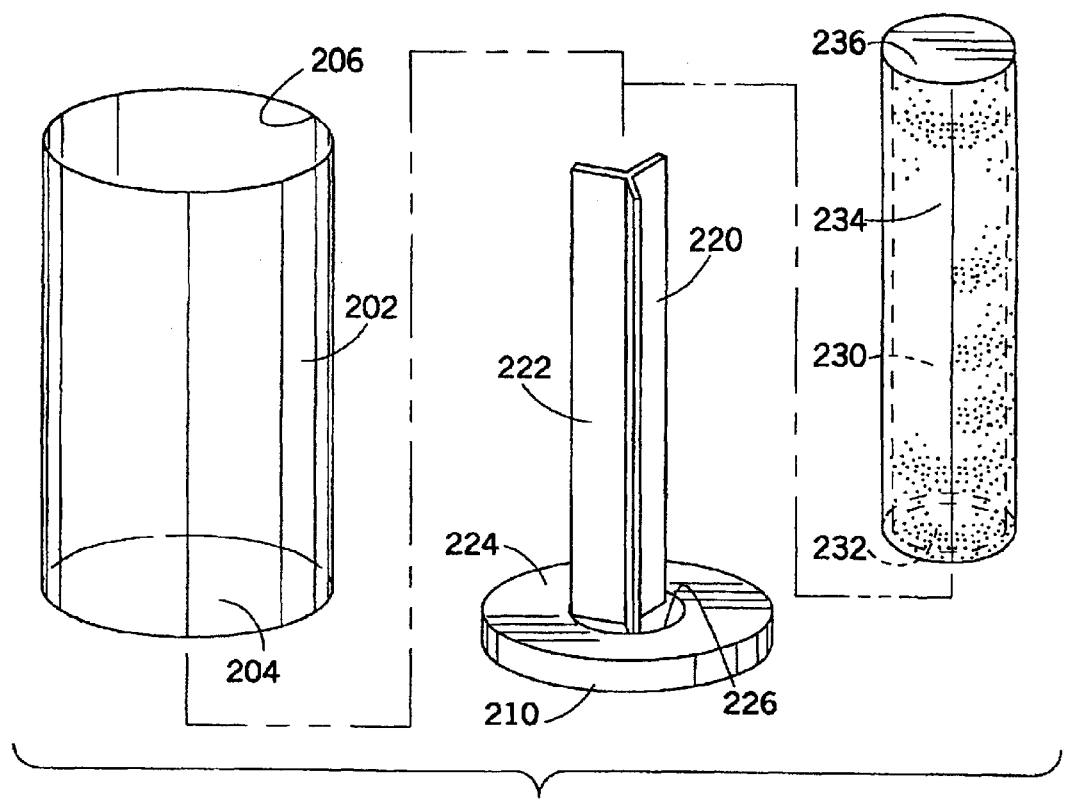
FIG. 7 is an exploded schematic perspective view of a dust cup cylinder, filter rack and filter employed in the vacuum cleaner of FIG. 6.

With reference now to FIG. 7, the filter and rack assembly includes a filter rack 220 having three vanes 222 which radiate away from each other like the spokes on a wheel. In other words, the vane assembly is Y-shaped in cross section. The filter rack is mounted on a base 224. Located at the bottom end of the base are three openings 226 which are separated from each other by the vanes 222 and extend only as far radially outwardly from a center point of the base 224 as is the length of each vane 222. A filter element 230 is supported on the filter rack. The filter element is a hollow member having an open lower end 232 which allows access to a hollow interior 234 of the filter. However, the filter can have a closed top end 236.

The interior 234 of the filter 230 is so sized as to allow the filter to be slipped over the vanes 222. The open lower end 232 of the filter thus is seated on the plate 224. However, the hollow interior 234 of the filter is in communication with the several openings 226 extending through the filter rack base 224. The filter rack base is preferably secured by conventional means to the open lower end 204 of the dirt cup cylinder 202 to close same. The upper end 206 of the dirt cup remains open.

Figure 9:
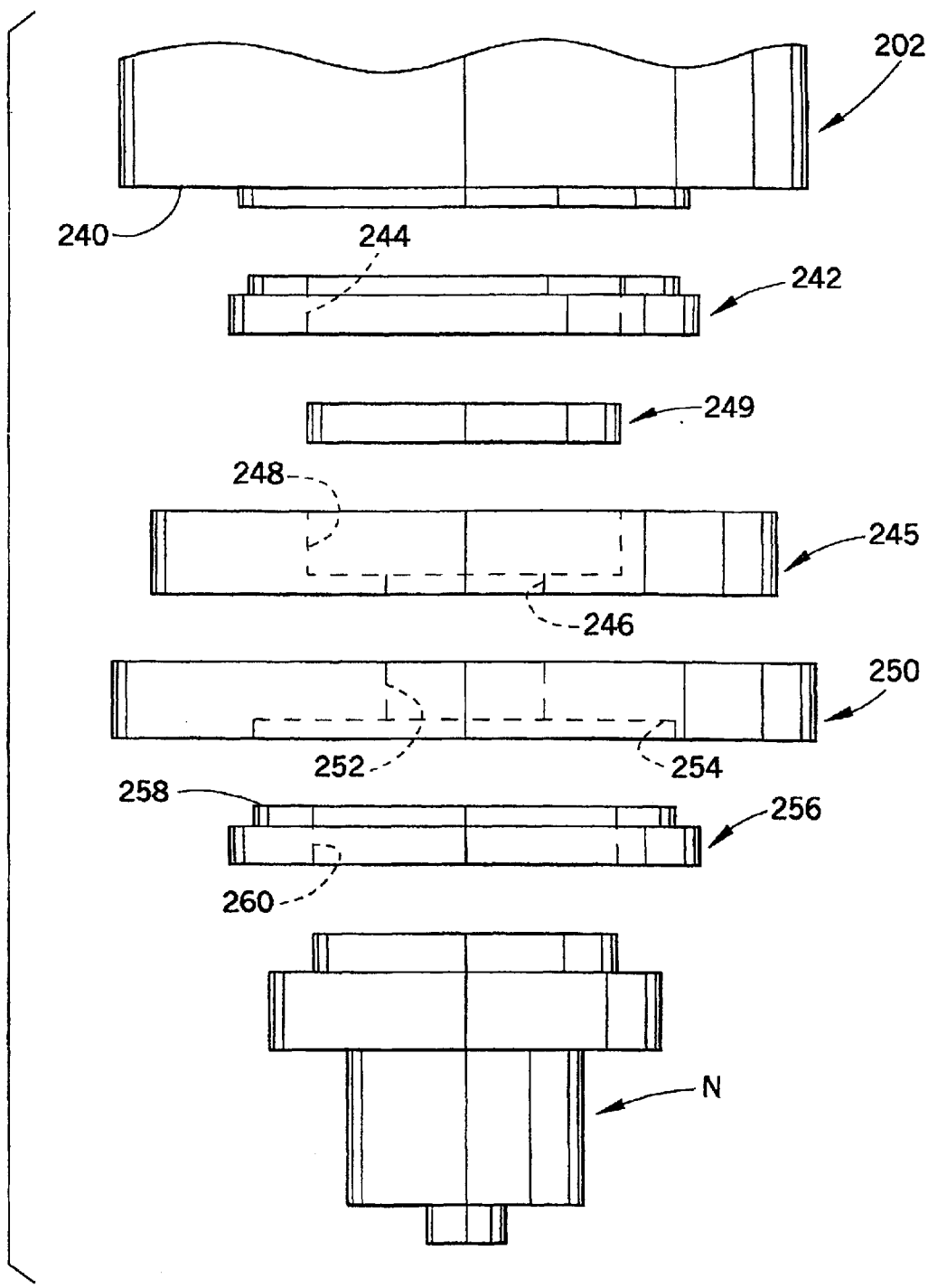

With reference now also to FIG. 9, positioned beneath a bottom face 240 of the dirt cup 202 is an elastomer ring seal 242 which has a central aperture 244 extending therethrough. The seal 242 is seated around the openings 226 of the filter rack base 224. A dirt cup support wall 245 of a housing of the vacuum cleaner contains a central opening 246 which is aligned with the aperture 244. An enlarged diameter section 248 is disposed on an upper face of the wall 245. Adapted to be housed in the opening is a post filter element 249. The post filter 249 can be made from a suitable conventional open cell foam plastic material, if so desired. The support wall 245 is meant to sit on a motor support wall 250 for mounting a suction motor N. The motor support has a centrally located bore 252 extending therethrough. The bore also includes an enlarged diameter section 254 defined on its lower face. A motor seal 256 has a reduced diameter upper end 258 which is accommodated in the enlarged diameter lower end 254 of the motor support 250. A centrally located bore 260 extends through the motor seal. In this embodiment, the motor and fan assembly N is positioned directly beneath the motor seal 256.

As is evident from FIG. 6, an in-line flow path is thus provided from the dust inlet 214 through the motor and fan assembly N. More specifically, dirty air flows into the dust inlet 214 and thus into the cyclonic chamber 212 defined within the dirt cup 202. As illustrated by the arrow 260 the airflow into the chamber 212 is tangential. This causes a vortex-type flow as is illustrated by arrows 262. Such vortex flow is directed downwardly in the dust chamber 212 since the top end thereof is blocked by the lid 208. The air flows radially inwardly and through the filter 230. The air then flows axially downwardly through the hollow interior of the filter 230 as illustrated by arrow 264. Subsequently, the air flows through the support wall opening 246, the motor support opening 252 and into and through the suction motor and fan assembly N as is illustrated by arrow 266. After being exhausted from the motor and fan assembly, the air flows through a conduit 270 defined in the upright housing section of the vacuum cleaner and into a plenum 272 which holds an output filter 274. This is illustrated schematically by the arrows 276 and 278 in FIG. 6.

Suction airflow from the cyclonic chamber 212 is not able to bypass the main filter element 230, but instead must pass therethrough and be filtered of residual contaminants due to the existence of the seal 242. However, should there be some reason why there is a leak between the filter 230 and the filter rack base 224, the post filter 249 (FIG. 9) will prevent dirt from being sucked directly into the motor and fan assembly N.

The conduit 270 is itself in fluid communication with the elongated plenum 272 that opens to the atmosphere and houses filter media 274. A protective grid or grate structure is snap-fit or otherwise effectively secured over the plenum 272 to secure the filter media in place. The filter media is preferably a high efficiency particulate arrest (HEPA) filter element in a sheet or block form. Those skilled in the art will recognize that even if the motor/fan assembly N causes contaminants to be introduced into the suction airstream downstream from the main filter element, the final filter assembly P will remove the same such that only contaminant-free air is discharged into the atmosphere.

The location of the inlet 214, the outlet 216, and the generally cylindrical configuration of the cyclonic airflow chamber 212 causes the suction airstream to follow a swirling or cyclonic path downward within the chamber 212 and then radially inward through the filter 230 to move downwardly through the inside of the centrally located main filter 230. The orientation of the inlet 214 will affect the direction of cyclonic airflow, and the invention is not meant to be limited to a particular direction, i.e, clockwise or counterclockwise.

Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container 202. The suction airstream then passes through the main filter element 230 so that residual contaminants are removed, and exits the cyclonic chamber 212 through the aperture 244 in the seal 242 and through the aperture 246 formed in the dirt cup support wall 245. The suction airstream is communicated to the motor/fan assembly N and exhausted through conduit 270 to the final filter assembly P where it is filtered again by the HEPA filter 274 to remove any contaminants that may have passed through the filter 230, and any contaminants in the airstream due to its passage through the motor/fan assembly N.

The main filter element 230 can be cleaned by washing it, either manually or in a dishwasher—since it is dishwasher-safe—to remove dust or dirt particles adhering to the filter element. It is, however, important that the filter 230 be dried before it is used again. The final filter media of the filter assembly 274, however, can not be cleaned and must be replaced when it becomes clogged.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An upright vacuum cleaner comprising:
   a housing;
   a base hingedly connected to said housing, said base having a suction opening;
   a suction source located in said housing and being in fluid communication with said suction opening;
   a dirt cup selectively mounted on said housing, said dirt cup being in fluid communication with said suction opening and said suction source;
   a filter member mounted in said dirt cup;
   a particle separation chamber at least partially defined in said dirt cup for separating particles from an airstream flowing from said suction opening through said filter member; and,
   an opening defined in a bottom wall of said dirt cup, the airstream flowing out of said dirt cup through said opening.

2. The upright vacuum cleaner of claim 1, wherein said filter member comprises a cylindrical body.

3. The upright vacuum cleaner of claim 2, wherein said cylindrical body of said filter comprises a top wall.

4. The upright vacuum cleaner of claim 3, wherein said top wall of said cylindrical body of said filter is impervious to airflow.

5. The upright vacuum cleaner of claim 1, further comprising an auxiliary filter member located in said housing upstream from said suction source.

6. The upright vacuum cleaner of claim 1, further comprising a final filter positioned downstream from said suction source.

7. The upright vacuum cleaner of claim 6, further comprising a plenum defined in said housing for selectively holding said final filter.

8. The upright vacuum cleaner of claim 1, further comprising a filter support member mounted in said dirt cup for supporting said filter member.

9. The upright vacuum cleaner of claim 1, wherein said dirt cup comprises a tangential inlet opening for the airstream flowing from said suction opening through said filter.

10. The upright vacuum cleaner of claim 1, wherein dirt contained in said dirt cup and located upstream from said filter member serves as an additional filter element for an airstream flowing through the dirt.

11. An upright vacuum cleaner comprising:
    a housing;
    a base having a suction opening, said base hingedly interconnected to said housing;
    a suction source located in said housing and being in fluid communication with said suction opening;
    a dirt cup selectively mounted on said housing, said dirt cup being in fluid communication with said suction opening and said suction source;
    a filter member mounted in said dirt cup;
    a particle separation chamber at least partially defined in said dirt cup for separating particles from an airstream flowing from said suction opening through said filter member; and,
    a lid for selectively covering an open upper end of said dirt cup.

12. The upright vacuum cleaner of claim 11, further comprising an opening defined in a bottom wall of said dirt cup, the airstream flowing out of said dirt cup through said opening.

13. The upright vacuum cleaner of claim 12, wherein dirt contained in said dirt cup and located upstream from said filter member serves as an additional filter element for an airstream flowing through the dirt.

14. The upright vacuum cleaner of claim 12, wherein said filter member covers said dirt cup opening.

15. The upright vacuum cleaner of claim 14, wherein said filter member comprises a cylindrical body.

16. The upright vacuum cleaner of claim 15, wherein said cylindrical body of said filter comprises a top wall.

17. The upright vacuum cleaner of claim 16, wherein said top wall of said cylindrical body of said filter member is impervious to airflow.

18. The upright vacuum cleaner of claim 12, further comprising a seal encircling said dirt cup opening.

19. The upright vacuum cleaner of claim 11, further comprising an auxiliary filter member located in said housing upstream from said suction source.

20. The upright vacuum cleaner of claim 11, further comprising a final filter positioned downstream from said suction source.

21. The upright vacuum cleaner of claim 20, further comprising a plenum defined in said housing for selectively holding said final filter.

22. The upright vacuum cleaner of claim 11, further comprising a filter support member mounted in said dirt cup for supporting said filter member.

23. The upright vacuum cleaner of claim 11, wherein said dirt cup comprises a tangential inlet opening for the airstream flowing from said suction opening through said filter member.

24. An upright vacuum cleaner comprising:
    a base portion;
    an upright housing hingedly connected to the base portion;
    a suction source mounted in one of said base portion and said upright housing;
    a dirt cup removably mounted to said upright housing;
    a lid selectively covering an open end of said dirt cup; and
    a filter located in said dirt cup for filtering an associated airstream passing through said dirt cup.

25. The upright vacuum cleaner as set forth in claim 24, wherein said filter is releasably secured to said dirt cup.

26. The upright vacuum cleaner of claim 25, wherein said filter comprises a cylindrical body.

27. The upright vacuum cleaner of claim 25, further comprising a seal encircling said dirt cup open end.

28. The upright vacuum cleaner of claim 25, further comprising an auxiliary filter member located in said one of said base portion and said upright housing upstream from said suction source.

29. The upright vacuum cleaner of claim 24, further comprising a final filter positioned downstream from said dirt cup.

30. The upright vacuum cleaner of claim 29, further comprising a plenum defined in said upright housing for selectively holding said final filter.

31. The vacuum cleaner of claim 24, further comprising a main filter housing, wherein at least a portion of said main filter housing is selectively detachable from said upright housing.

32. The vacuum cleaner of claim 31, wherein said filter is selectively retained within said at least a portion of said main filter housing.

33. The vacuum cleaner of claim 32, wherein said main filter housing comprises an airflow outlet which communicates with said suction source.

34. The vacuum cleaner of claim 24, wherein said filter element comprises a thermoplastic material.

35. The upright vacuum cleaner of claim 24 further comprising a handle attached to said dirt cup.

36. The upright vacuum cleaner of claim 24 further comprising a flexible conduit for connecting a suction opening in said base portion to an air path in said upright housing.

37. An upright vacuum cleaner comprising:
   a base portion including a suction opening;
   an upright housing hingedly connected to said base portion;
   a suction source mounted in one of said base portion and said upright housing;
   a dirt cup selectively mounted to said upright housing, said dirt cup comprising:
     an open first end,
     a side wall,
     a closed second end; and
     a lid selectively covering said open first end of said dirt cup and cooperating with said dirt cup to define a chamber, wherein said chamber comprises:
       a tangential inlet opening, and,
       an axial outlet opening, wherein said inlet opening of said chamber is in fluid communication with said suction opening and said outlet opening of said chamber is in fluid communication with said suction source.

38. The upright vacuum cleaner of claim 37, further comprising a filter mounted in said chamber for filtering an associated airstream passing through said dirt cup.

39. The upright vacuum cleaner of claim 38, wherein said filter is selectively positioned in said chamber and covers said axial outlet opening thereof.

40. The upright vacuum cleaner of claim 39, wherein said filter is cylindrical in shape.

41. The upright vacuum cleaner of claim 40, wherein said filter has a closed first end and an open second end.

42. The upright vacuum cleaner of claim 38, wherein said filter is releasably secured in said chamber to one of said dirt cup and said lid.

43. The upright vacuum cleaner of claim 42, wherein said filter comprises a cylindrical body.

44. The upright vacuum cleaner of claim 37, further comprising an auxiliary filter member located in said one of said base portion and said upright housing upstream from said suction source.

45. The upright vacuum cleaner of claim 37, further comprising a final filter positioned downstream from said suction source.

46. The vacuum cleaner of claim 37, further comprising a conduit fluidly connecting said suction opening of said base portion with said tangential inlet opening of said chamber.

47. The vacuum cleaner of claim 37, further comprising a main filter support member by which said main filter is supported.

48. The vacuum cleaner of claim 47, wherein said filter is selectively detachable from said main filter support member.

49. A vacuum cleaner comprising:
   a housing;
   a suction source mounted in said housing and being in fluid communication with a suction opening defined on said housing; and
   a dirt cup selectively mounted to said housing, said dirt cup comprising:
     an open first end,
     a side wall,
     a closed second end; and,
     a cover member selectively covering said open first end of said dirt cup and cooperating with said dirt cup to define a filtration chamber, wherein said filtration chamber comprises:
       a tangential inlet opening located adjacent a periphery of said filtration chamber to form a cyclonic airflow in said chamber, and,
       an axial outlet opening wherein said suction source communicates with said outlet opening of said filtration chamber and said suction opening defined in said housing communicates with said tangential inlet opening of said filtration chamber.

50. The vacuum cleaner of claim 49, further comprising a filter selectively positioned in said chamber and covering said outlet opening of said dirt cup, wherein said cyclonic airflow flows around said filter.

51. The vacuum cleaner of claim 50, further comprising a support on which said filter is selectively mounted.

52. The vacuum cleaner of claim 50 wherein said filter is cylindrical in shape.

53. The vacuum cleaner of claim 50, wherein said filter has a closed first end and an open second end.

54. The upright vacuum cleaner of claim 49, further comprising an auxiliary filter member located in said housing upstream from said suction source.

55. The upright vacuum cleaner of claim 49, further comprising a final filter positioned downstream from said suction source.

* * * * *

UNITED STATES PATENT AND TRADEMARK OFFICE
CERTIFICATE OF CORRECTION

PATENT NO. : 6,735,817 B2
DATED : May 18, 2004
INVENTOR(S) : Bair et al.

It is certified that error appears in the above-identified patent and that said Letters Patent is hereby corrected as shown below:

Title page,
Item [63], Related U.S. Application Data, should read as follows:
-- [63] Continuation of application No. 09/461,120, filed on Dec. 14, 1999,
now Pat. No. 6,353,963, which is a continuation-in-part of
application No. 09/216,529, filed on Dec. 18, 1998,
now Pat. No. 6,070,291, which is a continuation-in-part of
application No. 09/122,541, filed on Jul. 24, 1998,
now Pat. No. 6,026,540, which is a continuation-in-part of
application No. 09/004,999 filed on Jan. 9, 1998,
now Pat. No. 6,003,196. --

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,735,817 B2  Page 1 of 1
APPLICATION NO. : 10/094675
DATED : May 18, 2004
INVENTOR(S) : Kenneth W. Bair et al.

It is certified that error appears in the above-identified patent and that said Letters Patent is hereby corrected as shown below:

This certificate supersedes the Certificate of Correction issued June 7, 2005. The certificate should be vacated since change in Item [63] was not approved by the examiner. No Certificate of Correction should have been issued for this patent number.

Signed and Sealed this

Nineteenth Day of January, 2010

David J. Kappos
*Director of the United States Patent and Trademark Office*